March 27, 1956 — A. PAULAVICH — 2,739,685
CLUTCH ACTUATOR
Filed Feb. 1, 1955 — 2 Sheets-Sheet 1
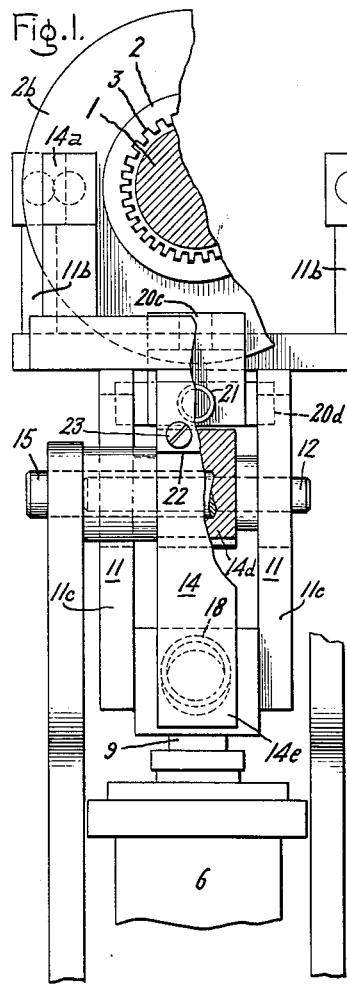
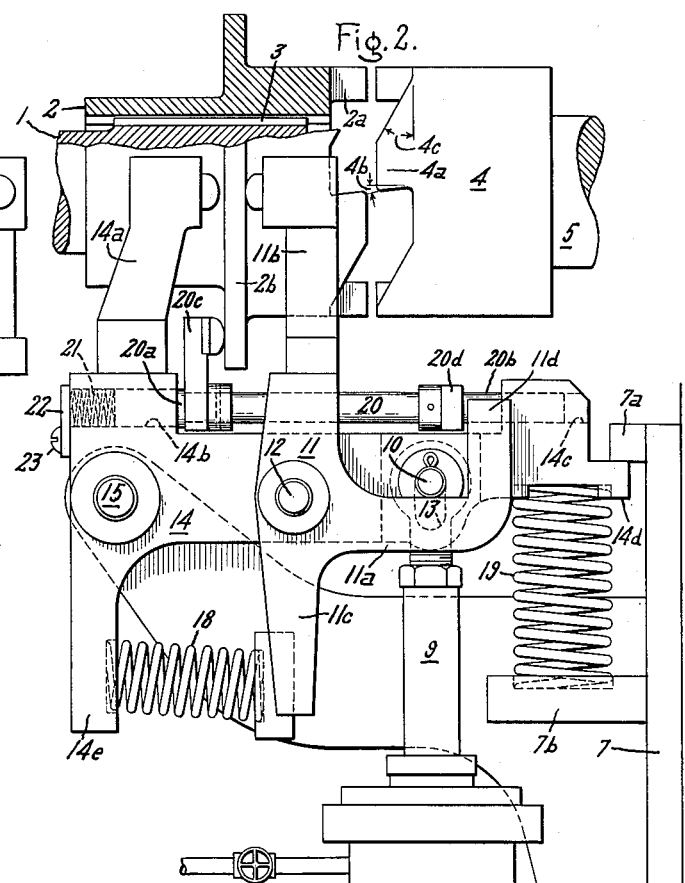
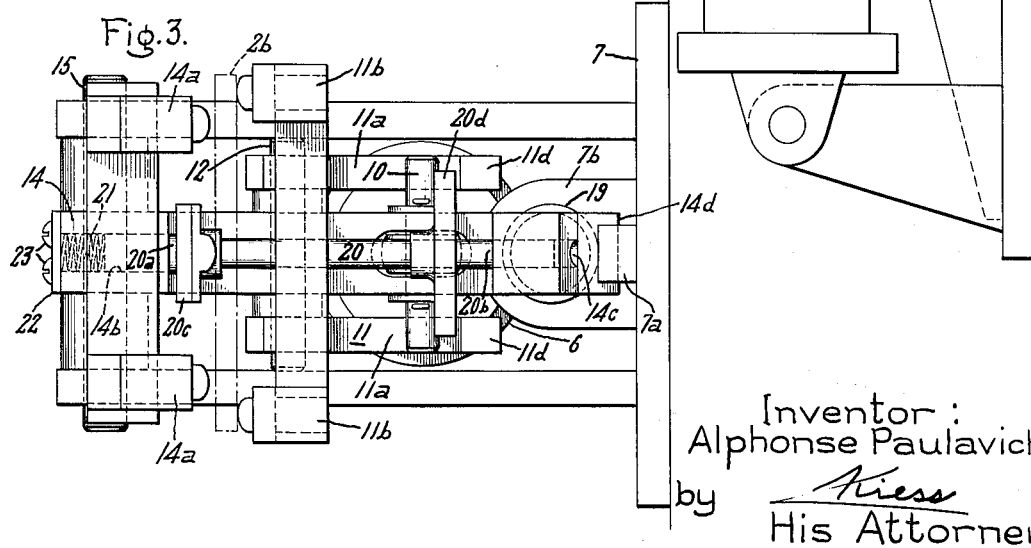
Inventor:
Alphonse Paulavich
by Kiess
His Attorney

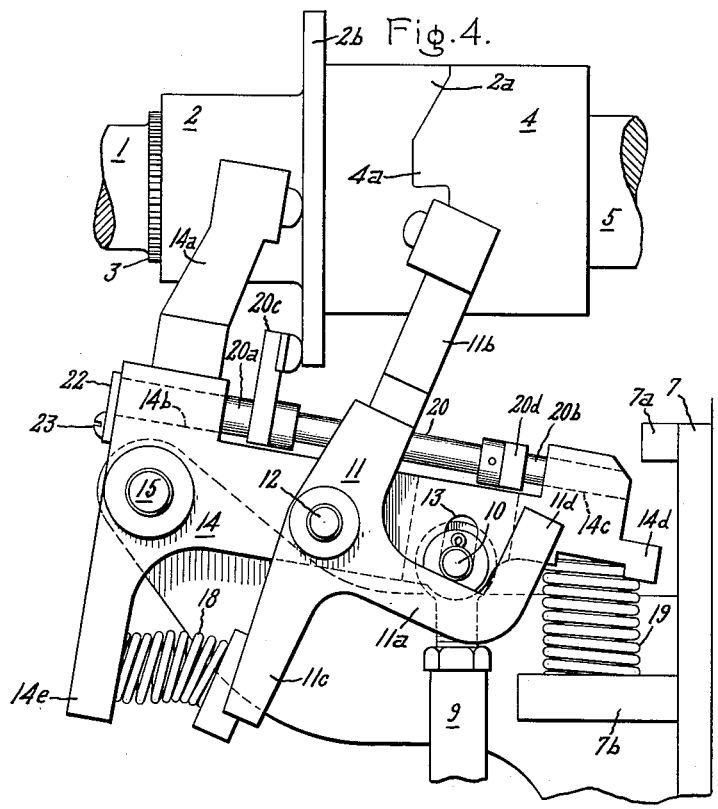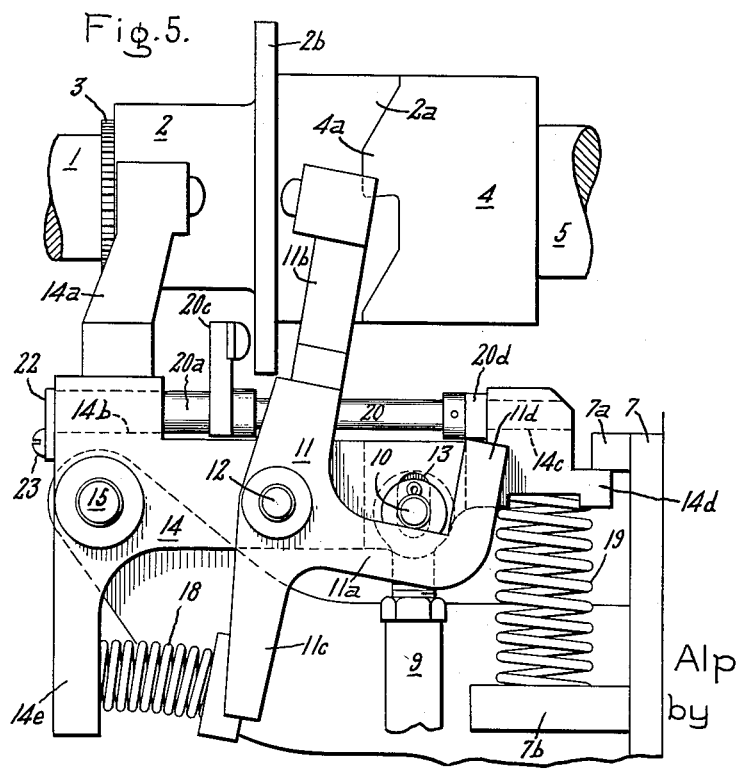

United States Patent Office 2,739,685
Patented Mar. 27, 1956

2,739,685

CLUTCH ACTUATOR

Alphonse Paulavich, Saugus, Mass., assignor to General Electric Company, a corporation of New York Application February 1, 1955, Serial No. 485,433

7 Claims. (Cl. 192—99)

This invention relates to clutch mechanism, particularly to a clutch used to engage and disengage the starting motor of a gas turbine powerplant.

In practice, when starting motors are used to start gas turbines there is difficulty involved in completely disengaging the starting motor from the gas turbine after the gas turbine has been brought up to speed. Normally, the overrunning of the gas turbine relative to the starting motor disengages the clutching mechanism between the starting motor and the gas turbine by the action of the clutch itself. However, this method of disengagement leaves open the possibility of friction contact between the two faces of the clutch which would tend to cause excessive wear between the clutch teeth.

Accordingly, it is an object of this invention to provide a clutch mechanism which will be automatically disengaged and positively held disengaged after the gas turbine has been brought up to speed.

A further object of this invention is to provide a positive locking arrangement for maintaining the clutch disengaging mechanism out of contact with the clutch until the gas turbine has been brought up to speed.

Other objects and advantages will become apparent from the following description taken in connection with the accompanying drawings, in which Fig. 1 is a front view, partially in section, showing the clutch mechanism in the disengaged position, Figs. 2 and 3 are side and plan views respectively of the mechanism shown in Fig. 1, Fig. 4 is a side view of the clutch mechanism shown in the engaged position at the time of initial engagement, and Fig. 5 is a side view showing the mechanism in the engaged position after release of the auxiliary power means.

Generally stated, the invention is practiced by providing a lever mechanism which when actuated by an auxiliary power means will serve to engage the clutch mechanism to connect a starting motor with a gas turbine shaft, and after the gas turbine has been brought up to speed the lever mechanism will positively move the clutch to a completely disengaged position, so that accidental clashing of the driven clutch element with the driving element is prevented.

Referring now to Fig. 1, there is illustrated a shaft 1 connected to a starting motor (not shown). This starting motor is adapted to be connected through my novel clutching mechanism to the shaft 5 of a gas turbine. The function of the starting motor is to bring the shaft 5 of the gas turbine up to the required speed, after which it is disengaged therefrom and the starting motor de-energized.

The shaft 1 is connected to the clutch hub 2 by splines 3. The clutch hub defines at one end thereof clutch teeth 2a. Hub 2 is adapted to be engaged with fixed clutch hub member 4 which defines thereon clutch teeth 4a adapted to interengage the clutch teeth 2a. The hub member 4 is secured to the turbine shaft 5. With this arrangement, the clutch hub 2 is capable of longitudinal movement so that when the gas turbine is brought up to speed the clutch hub 2 can be disengaged from the clutch member 4 by moving longitudinally to the left toward the shaft 1.

The clutch teeth 4a are constructed with a small reverse "rake angle" 4b and a "cam angle" 4c. The "rake angle" 4b prevents the clutch from separating as long as the starting motor is applying torque. However, when the torque reverses due to the turbine overrunning the starting motor, the "cam angle" causes the teeth to disengage and move the clutch hub 2 longitudinally to the left.

The clutch members 2, 4 are brought into engagement through applicant's novel clutch actuator which is mounted on a pedestal 7.

The clutch actuator comprises a special lever arrangement for engaging and disengaging the clutch, resilient means for biasing said lever arrangement into contact with one of said clutch members to disengage the clutch, an auxiliary power means acting in opposition to the resilient means and operable through the lever mechanism to bring the clutch into engagement, and a locking mechanism to maintain the lever mechanism out of engagement with the clutch after the clutch has been engaged by the auxiliary power means until the clutch has been disengaged.

The lever mechanism comprises a pair of pivoted levers 11, 14. Lever member 14 in plan view is substantially T shaped and is pivotally mounted on rod 15. It further defines a pair of transversely spaced arms 14a which are adapted to engage flange portion 2b of clutch member 2. The function of these arms is to move the clutch member 2 into engagement with clutch member 4 when lever 14 is rotated in a clockwise direction by the action of an auxiliary power means to be later described.

Lever member 14 is maintained in the position shown in Fig. 1 by the bias of spring 19 which is located between the end portion 14d of lever member 14 and bracket 7b secured to clutch pedestal 7. To restrict the counterclockwise movement of lever 14 a stop 7a is provided by the pedestal 7.

The auxiliary power means for rotating the lever 14 on its pivot 15 may be an air cylinder 6 secured to the clutch pedestal 7. The air cylinder 6 actuates a rod 9 which has secured to its upper end a pin 10 which is substantially equal in length to the diameter of clutch members 2, 4 (see Fig. 3). The pin 10 is disposed in an elongated vertical slot 13 defined by lever member 14. The pin 10 abuts the lever 14 to move the arms 14a into contact with the flange 2b to engage the clutch.

The air cylinder 6 is operated by controls which may be actuated in connection with a standard electrical switching arrangement for operating the starting motor, or by any other conventional means, the details of which are not important to an understanding of the invention disclosed herein.

Disposed adjacent lever 14 is a lever member 11 pivoted on rod 12. This lever comprises four portions 11a, 11b, 11c, and 11d. The first portion 11a is a double arm arrangement disposed on opposite sides of the center of the clutch hub members 2, 4 (see Fig. 3), and adapted to be engaged by the pin 10. With this arrangement, when the rod 9 is moved downwardly the lever is rotated in a clockwise direction. This clockwise movement moves it completely out of engagement with clutch member 2 (see Fig. 4). The lever 11 has a second pair of arms 11b which are adapted to engage flange portion 2b of clutch member 2 on the side opposite to that engaged by lever arms 14a. This double contact arrangement provides for smooth axial movement of the clutch hub 2 relative to the driven hub 4 when the lever 11 moves in a counterclockwise direction. Fig. 2 shows the lever member 11 in its "disengaged" condition in which position it urges the clutch hub member 2 to its extreme lefthand position, out of engagement with clutch member 4. The lever member 11 is maintained in the vertical position shown in Fig. 2 by the bias of compression spring 18, which is mounted between the lever arm 11c and the arm 14e of lever 14. This bias of spring 18 urges the arms 11a up against pin 10 and maintains the arms 11b in engagement with flange 2b of clutch member 2. The bias of spring 18 is weaker than that of spring 19 thus allowing spring 19 to bias the lever member 14 to the position shown in Fig. 1. The fourth portion 11d is in the form of a pair of arms projecting upward from arms 11a. These arms are adapted to be engaged by a latch mechanism, to be described in detail hereinafter, to prevent the lever 11 from being rotated in a counterclockwise direction until the clutch has been disengaged.

The latch mechanism (Fig. 5) comprises a T bar 20 which is slidably supported on the lever 14. To accomplish this, the T bar defines cylindrical portions 20a, 20b which are disposed in holes 14b, 14c defined by lever member 14. The T bar defines an abutment portion 20c which is adapted to engage flange 2b when the clutch is in the disengaged position (Fig. 1). The abutment portion 20c is caused to contact flange 2b by a spring 21 disposed within the recess 14c between the cover plate 22 and the adjacent end portion 20a of rod 20. Cover plate 22 may be secured to the lever member 14 by screws 23.

The relationship between the locking bar 20 and the lever 11 is such that when the clutch is disengaged the righthand end portion of bar 20 is disposed out of contact with lever 11.

The spring 21 maintains the abutment portion 20c in contact with the flange 2b when the clutch member 2 is moved into engagement with the clutch member 4. With the clutch engaged and the servomotor de-energized, the lever 14 is returned to its vertical position through the action of spring 19. However, due to spring 21, the bar 20 remains in its extreme righthand position (see Fig. 5). This position locates the end portion of bar 20 above lever arms 11d.

The end portion of the bar 20 defines a transverse rod 20d. The function of this bar is to restrict the counterclockwise movement of lever arms 11d so that when the clutch is engaged and the servomotor de-energized the lever arms 11b will be prevented from contacting flange 2b to move the clutch member 2 out of engagement with the clutch member 4. When the clutch is disengaged by the reversal of torque the flange 2b contacts the abutment member 20c to move it to the left. The relationship between the locking bar 20 and lever 11 is such that when the clutch is disengaged the portion 20d is disposed out of engagement with the arms 11a. Lever arms 11b are then free through the action of spring 18 to engage flange 2b to positively disengage the clutch.

Starting from the disengaged position shown in Fig. 1 the novel clutch actuator operates in the following manner.

The clutch shown in Fig. 1 is in the neutral disengaged position before energization of the servomotor. This position is determined by the bias of springs 18 and 19 which maintains the lever members 11, 14 in their vertical positions as shown.

Upon admission of air to air cylinder 6 the rod 9 is moved downwardly. This movement of rod 9 carries with it attached pin 10. Pin 10 abuts lever arms 11a to pivot lever 11 on pivot 12 in a clockwise direction. Pin 10 is located in elongated slot 13 of lever member 14 so that lever 11 is moved in a clockwise direction out of engagement with flange 2b before pin 10 reaches the bottom of slot 13. Upon reaching the bottom of slot 13, pin 10 engages lever 14 to move it in a clockwise direction along with lever 11. This movement of lever member 14 brings lever arms 14a into engagement with flange 2b of clutch member 2 to move clutch member 2 into engagement with clutch member 4.

When rod 9 has reached the bottom of its travel, lever 14 will have moved clutch member 2 into engagement with clutch member 4. This action of rod 9 acting through rod 10 is in opposition to spring 19 which acts to move the lever members in a counterclockwise direction.

The bar 20 which is slidably disposed in lever member 14 and biased in a righthand direction due to spring 21 maintains the abutment portion 20c in contact with flange 2b during its movement to a clutch engaged position (as shown in Figs. 4 and 5).

Upon engagement of clutch member 2 with clutch member 4 the reverse "rake angle" 4b maintains the clutch engaged as long as the clutch member 2 which is connected to a drive shaft 1 is going faster than the driven shaft 5. After the clutch has been engaged, controls (not shown) actuate the starting motor to drive the gas turbine shaft 5.

After the starting motor has been actuated, the air cylinder 6 is vented through a suitable valve means 6a to release the air in cylinder 6 to permit rod 9 to be moved upwardly. With this freedom of movement of rod 9, the lever members are then free to move in a counterclockwise direction through the action of spring 19 which is constantly biasing lever 14 in a counterclockwise direction. During the movement of lever 14 in a counterclockwise direction the rod 20 through the action of spring 21 remains in the position substantially shown in Fig. 5 with the abutment portion 20c in contact with flange 2b. The movement of lever 14 acting through lever arms 14e and spring 18 biases lever member 11 in a counterclockwise direction. This movement of lever member 11 would move lever arms 11b into engagement with flange 2b to disengage the clutch before actual disengagement of the clutch takes place during the reversal of torque. However, since bar 20 is maintained in the position shown in Fig. 5 by spring 21, the lever 11 cannot move into engagement with flange 2b since it engages the transverse rod portion 20d of bar 20 before it can engage flange 2b. This position is maintained as long as the driving motor (not shown) is driving the turbine shaft 5.

When the gas turbine shaft is going faster than the driving shaft, the clutch member 4 through "cam angle" 4c will cam the clutch teeth 2a out of engagement therewith to disconnect the starting motor from the gas turbine. When this is accomplished the starting motor may be de-energized, as for instance by a suitable limit switch (not shown) engaged by a portion of the axially moving member 2. Upon disengagement of clutch member 2 flange 2b will contact abutment portion 20c of rod 20 to move it to the left out of engagement with lever arms 11d. This movement of rod 20 permits the lever member 11 to move to the vertical position shown in Fig. 1 through the action of springs 18 and 19. The arms 11b then engage flange 2b to positively move the clutch member 2 out of engagement with clutch member 4.

The clutch actuator will stay in this disengaged position until the air cylinder 6 is again energized to re-engage the clutch.

It will be seen that the invention provides an improved positive clutch which may be conveniently arranged for remote actuation, which is automatically held in engaged position by torque transmittal in one direction, and without frictional rubbing between stationary and moving parts, and which acts to positively hold the driving member safe from accidental engagement with the driven member when the clutch is automatically disengaged by the action of the driven member overtaking the driving member.

While the invention has been described as particularly adapted for connecting a starting motor to a gas turbine rotor, it will be appreciated that this improved clutch mechanism may find many other applications.

While I have illustrated and described a particular embodiment of my invention, modifications thereof will occur to those skilled in the art. The size and shape of the lever members could be other than that shown in the drawings, and the shape of the locking bar may vary. Of course, it is desired to cover by the appended claims all such modifications which fall in the true spirit and scope of the invention.

What I claim as new and desire to secure by Letters Patent of the United States is:

1. Power transmission means including a jaw clutch comprising a driving member and a driven member having cooperating clutch teeth, the clutch teeth having a cam angle whereby upon torque reversal the members will be caused to disengage, lever means adapted to engage the driving member to move it into or out of engagement with the driven member, resilient means biasing said lever means into contact with the driving member to move it out of engagement with the driven member, servomotor means operable through the lever means to overpower the resilient means and cause the driving member to engage the driven member, locking means for maintaining said lever means disengaged from the driving member when the clutch is engaged, said locking means comprising a latch member disposed adjacent to and adapted to be engaged by the driving member and moved thereby to an unlocked position when the clutch members disengage, whereby the resilient means is caused to bias the driving member out of engagement with the driven member.

2. Power transmission means including a jaw clutch comprising a driving member and a driven member having cooperating clutch teeth, the teeth on the driven member having a cam angle such that when the speed of the driven member exceeds that of the driving member the members will be caused to disengage, lever means adapted to engage the driving member to move it into or out of engagement with the driven member, said lever means including first and second pivoted lever members, resilient means biasing the first lever member into contact with the driving member and the second lever member out of contact therewith to thereby tend to disengage the clutch, a servomotor having a member adapted to engage said lever means, means for actuating said servomotor to cause said lever members to rotate about their pivots in the direction to effect engagement of the driving member with the driven member, locking means for maintaining said lever means disengaged from the driving member when the clutch is engaged, said locking means comprising a latch member disposed adjacent to and adapted to be engaged by the driving member and moved thereby to and unlocked position when the clutch members disengage, whereby the resilient means is caused to bias the driving member out of engagement with the driven member.

3. Clutch mechanism comprising a drive shaft, a first clutch member keyed for axial sliding movement on said drive shaft and defining a circumferential flange, a driven shaft, a second clutch member secured to said driven shaft, the clutch members defining cooperating clutch teeth and having a cam angle whereby upon torque reversal the clutch members will be caused to disengage, means for engaging and disengaging said clutch members comprising lever means adapted to engage said flange to move the first clutch member toward and away from said second clutch member, said lever means comprising a first pivoted lever member having an arm adapted to engage said flange to move the first clutch member toward the driven member, a second pivoted lever member having an arm adapted to engage the opposite side of said flange to move the first cultch member away from the second clutch member, resilient means biasing the second lever member into contact with the flange and the first lever member out of contact therewith to thereby tend to disengage the clutch, servomotor means operable through the lever means to overpower the resilient means and cause the clutch members to engage, locking means for maintaining the second lever member in a position out of engagement with said flange when the clutch members are engaged, said locking means comprising a latch member disposed adjacent to and adapted to be engaged by said flange and moved thereby to an unlocked position when the clutch members disengage, whereby the resilient means is caused to bias the first clutch member to a completely disengaged position.

4. Clutch mechanism comprising a drive shaft, a first clutch member keyed for axial sliding movement on said drive shaft and defining a circumferential flange, a driven shaft, a second clutch member secured to said driven shaft, the clutch members defining cooperating clutch teeth, the teeth on said second clutch member having a cam angle such that when the speed of the driven shaft exceeds that of the drive shaft the second clutch member will cause the first clutch member to disengage, means for engaging and disengaging said clutch members comprising lever means adapted to engage said flange to move the first clutch member toward and away from said second clutch member, said lever means comprising a first pivoted lever member having an arm adapted to engage said flange to move the first clutch member toward the driven member, a second pivoted lever member having an arm adapted to engage the opposite side of said flange to move the first clutch member away from the second clutch member, a servomotor having a member adapted to engage said lever means, means for actuating said servomotor to cause said lever members to rotate about their pivots in the direction to effect engagement of the clutch members, said arm of the first lever member being adapted to engage said first clutch member to move it into engagement with said second clutch member when the first lever member is pivoted by the action of the servomotor, resilient means biasing the second lever member into contact with the flange and the first lever member out of contact therewith to thereby tend to disengage the clutch, a latch mechanism carried on said second lever member and adapted to lock said second lever member in a position out of engagement with said flange when the clutch members are engaged, said latch having a member in contact with said flange, whereby when the clutch members are disengaged, by the driven member overtaking the driving member, the latch is moved out of locking engagement with said second lever member to thereby permit the second lever member to abut said flange to move the first clutch member to a completely disengaged position.

5. Clutch mechanism comprising a drive shaft, a first clutch member keyed for axial sliding movement on said drive shaft and defining a circumferential flange, a driven shaft, a second clutch member secured to said driven shaft, the clutch members defining cooperating clutch teeth, the teeth on said second clutch member having a cam angle such that when the speed of the driven shaft exceeds that of the drive shaft the second clutch member will cause the first clutch member to disengage, means for engaging and disengaging said clutch members comprising lever means adapted to engage said flange to move the first clutch member toward and away from said second clutch member, said lever means comprising a first pivoted lever member having an arm adapted to engage said flange to move the first clutch member toward the driven member, a second pivoted lever member having an arm adapted to engage the opposite side of said flange to move the first clutch member away from the second clutch member, a servomotor having a member adapted to engage said lever means, means for actuating said servo motor to cause the lever members to rotate about their pivots in the direction to effect engagement of the clutch members, said arm of the first lever member being adapted to engage said first clutch member to move it into engagement with said second clutch member when the first lever member is pivoted by the action of the servomotor, resilient means biasing the second lever member into contact with the flange and the first lever member out of contact therewith to thereby tend to disengage the clutch, locking means for preventing engagement of the second lever member with the first clutch member to disengage it from the second clutch member upon release of the member operated by said servo-motor, the locking mechanism comprises a rod member defining end portions disposed in the first lever member, a first intermediate portion of the rod disposed adjacent thereto and adapted to engage said flange, the rod defining a second transversely disposed intermediate portion, means urging the first intermediate portion of said rod into engagement with said flange and locating the transversely disposed portion thereof adjacent the second lever member so that during movement of the second lever member in a direction to engage the flange it will contact the transversely disposed portion of the rod to prevent the second lever member from contacting the flange to disengage the clutch when the clutch is engaged, and when the clutch is disengaged due to the overspeed of the driven shaft acting through the cam angle of the teeth, the second intermediate portion of the rod is urged out of engagement with the second lever member by the circumferential flange engaging the first intermediate portion of said rod to permit the second lever member to contact the first clutch member to positively disengage the clutch.

6. A power transmission system including a clutch mechanism connecting a first drive shaft with a second shaft to be driven, support means for the clutch mechanism, said clutch mechanism comprising a first clutch member splined to said first shaft and defining a circumferential flange, a second clutch member secured to said second shaft, the clutch members defining cooperating clutch teeth, the teeth on said second clutch member having a cam angle such that when the speed of said driven shaft exceeds that of the drive shaft the second clutch member will cam the first clutch member out of engagement therewith, means for engaging and disengaging said clutch members, said means comprising a lever mechanism adapted to engage said flange to move the first clutch member toward and away from said second clutch member, the lever mechanism comprising a pair of pivoted levers, the first pivoted lever defining an arm adapted to engage said flange on one side thereof to move the first clutch member toward the second clutch member, the second pivoted lever defining a first arm adapted to engage said flange on the opposite side to that engaged by the arm of said first lever member to move the clutch member away from the second clutch member, resilient means biasing the second lever member into contact with the flange and the first lever member out of contact therewith to thereby tend to disengage the clutch, a servomotor having a stem extending therefrom, the stem having a pin member secured to its outer end portion and adapted to be actuated by said servomotor, the pin member engaging a second arm defined by said second lever member, the pin being disposed in a slot defined by the first lever member and adapted to pivot the second lever member upon initial actuation of the servomotor and the first lever member upon reaching the bottom of said slot, a latch mechanism carried on said second lever member and adapted to lock said second lever member into position out of engagement with said flange when the clutch members are engaged, said latch having a member in contact with said flange, whereby when the clutch members are disengaged, by the driven member overtaking the driving member, the latch is moved out of locking engagement with said second lever member to thereby permit the second lever member to abut said flange to move the first clutch member to a completely disengaged position.

7. A power transmission system including a clutch mechanism connecting a first drive shaft with a second shaft to be driven, support means for the clutch mechanism, said clutch mechanism comprising a first clutch member splined to said first shaft and defining a circumferential flange, a second clutch member secured to said second shaft, the clutch members defining cooperating clutch teeth, the teeth on said second clutch member having a cam angle such that when the speed of said driven shaft exceeds that of the drive shaft the second clutch member will cam the first clutch member out of engagement therewith, means for engaging and disengaging said clutch members, said means comprising a lever mechanism adapted to engage said flange to move the first clutch member toward and away from said second clutch member, the lever mechanism comprising a pair of pivoted levers, the first pivoted lever defining an arm adapted to engage said flange on one side thereof to move the first clutch member toward the second clutch member, the second pivoted lever member defining a first arm adapted to engage said flange on the opposite side to that engaged by the arms of said first lever member to move the first clutch member away from the second clutch member, a first resilient means biasing the second lever member into contact with the flange and the first lever member out of contact therewith to thereby tend to disengage the clutch, said first resilient means comprising a first relatively strong spring disposed between the support means and the first lever member tending to move it out of engagement with said flange, and a second relatively weak spring disposed between the lever members tending to move the second lever member into contact with said flange to separate the two clutch members, a servomotor having a stem extending therefrom, the stem being actuated by said servomotor and having a pin member secured to its outer end portion, the pin member engaging a second arm defined by said second lever member, the pin being disposed in a slot defined by the first lever member, the pivot for said first and second lever members being on the same side of the stem member, whereby when the stem is actuated by the servomotor the second lever member is pivoted out of engagement with the flange and upon reaching the bottom of the slot the first lever member is pivoted to a position in which it contacts the flange to move the clutch members into engagement, locking means for preventing engagement of the second lever member with the first clutch member to disengage it from the second clutch member upon release of the stem by the servomotor, the locking mechanism comprising a rod member defining end portions disposed in the first lever member, a first intermediate portion of the rod disposed adjacent thereto and adapted to engage said flange, the rod defining a second transversely disposed intermediate portion, a second resilient means urging the first intermediate portion of said rod into engagement with said flange and the transversely disposed portion into a position whereby it will be abutted by the second lever member during movement of the second lever member in a direction to engage the flange to prevent it from contacting the flange to disengage the clutch when the clutch is engaged, and when the clutch is disengaged due to the overspeed of the driven shaft acting through the cam angle of the teeth, the second intermediate portion of the rod is disengaged from the second lever member to permit the second lever member to contact the first clutch member to positively disengage the clutch.

No references cited.